United States Patent
Anderson et al.

(10) Patent No.: US 8,069,820 B2
(45) Date of Patent: Dec. 6, 2011

(54) PET SHELTER CONSTRUCTION

(75) Inventors: Torrence Anderson, Overland Park, KS (US); Jed Richardson, Batavia, IL (US); Robert Kopp, Wheaton, IL (US); Robert Stein, Aurora, IL (US)

(73) Assignee: Suncast Corporation, Batavia, IL (US)

( * ) Notice: Subject to any disclaimer, the term of this patent is extended or adjusted under 35 U.S.C. 154(b) by 217 days.

(21) Appl. No.: 11/962,354

(22) Filed: Dec. 21, 2007

(65) Prior Publication Data

US 2009/0159013 A1 Jun. 25, 2009

(51) Int. Cl.
*A01K 1/03* (2006.01)
(52) U.S. Cl. ...................................................... 119/498
(58) Field of Classification Search .................. 119/498, 119/499, 428, 431, 482, 461, 472, 474; 446/478; *A01K 1/00, 1/02, 1/03*
See application file for complete search history.

(56) References Cited

U.S. PATENT DOCUMENTS

| | | | |
|---|---|---|---|
| 4,006,713 A | 2/1977 | Hawley, III | |
| 4,802,443 A | 2/1989 | Denmark | |
| 5,081,956 A | 1/1992 | Greitzer et al. | |
| 5,115,762 A | 5/1992 | Long | |
| 5,121,710 A | 6/1992 | Gonzalez | |
| 5,220,883 A | 6/1993 | Long | |
| D359,588 S * | 6/1995 | Brazis | D30/108 |
| 5,551,371 A * | 9/1996 | Markey et al. | 119/499 |
| 5,575,239 A | 11/1996 | Bradburn et al. | |
| D377,406 S | 1/1997 | McKinstray | |
| 5,657,583 A * | 8/1997 | Tennant | 52/79.5 |
| D388,910 S | 1/1998 | Willinger et al. | |
| 5,727,501 A | 3/1998 | York | |
| 5,758,987 A | 6/1998 | Frame et al. | |
| 5,791,293 A | 8/1998 | Northrop et al. | |
| 5,937,792 A | 8/1999 | Madrid | |
| D420,470 S | 2/2000 | Kolozsvari et al. | |
| 6,042,296 A | 3/2000 | Wittig et al. | |
| 6,173,547 B1 | 1/2001 | Lipson | |
| 6,406,236 B1 | 6/2002 | Olson, Jr. | |
| 6,446,414 B1 | 9/2002 | Bullard, III et al. | |
| 6,513,456 B2 * | 2/2003 | Sherman et al. | 119/499 |
| 6,581,337 B1 | 6/2003 | Skov et al. | |
| 6,715,185 B2 | 4/2004 | Angellotti | |
| 6,758,167 B1 | 7/2004 | Edelinski | |
| 6,843,025 B2 | 1/2005 | Paz | |
| D501,959 S | 2/2005 | Greene | |
| D501,962 S * | 2/2005 | Neves | D30/161 |
| 6,892,497 B2 * | 5/2005 | Moon et al. | 52/79.1 |
| 7,021,243 B2 | 4/2006 | Harper et al. | |
| 7,104,221 B2 * | 9/2006 | Simon | 119/498 |

(Continued)

FOREIGN PATENT DOCUMENTS

GB 2240024 A * 7/1991

*Primary Examiner* — Son T Nguyen
*Assistant Examiner* — Shadi Baniani
(74) *Attorney, Agent, or Firm* — McHale & Slavin, P.A.

(57) ABSTRACT

The instant invention is directed to a pet shelter for domestic pets. More specifically, the instant invention is a pet shelter constructed from a plurality of plastic panels each having integral connectors. The panels are constructed and arranged to be shipped and/or stored in a nested or stacked arrangement to reduce space requirements and shipping costs. The integral fasteners formed onto the panels intermesh to allow the panels to be snapped together without the need for additional fasteners or tools.

10 Claims, 16 Drawing Sheets

U.S. PATENT DOCUMENTS

| | | |
|---|---|---|
| 7,243,614 B1 | 7/2007 | Byers |
| D591,458 S * | 4/2009 | Richardson .................. D30/112 |
| 7,581,357 B2 * | 9/2009 | Richardson et al. ........... 52/79.5 |
| 2004/0168392 A1 | 9/2004 | Konzelmann et al. |
| 2004/0187400 A1 * | 9/2004 | Anderson et al. .............. 52/79.1 |
| 2005/0076854 A1 * | 4/2005 | Passno et al. ................. 119/500 |
| 2005/0103279 A1 * | 5/2005 | Brewer et al. ................ 119/498 |

\* cited by examiner

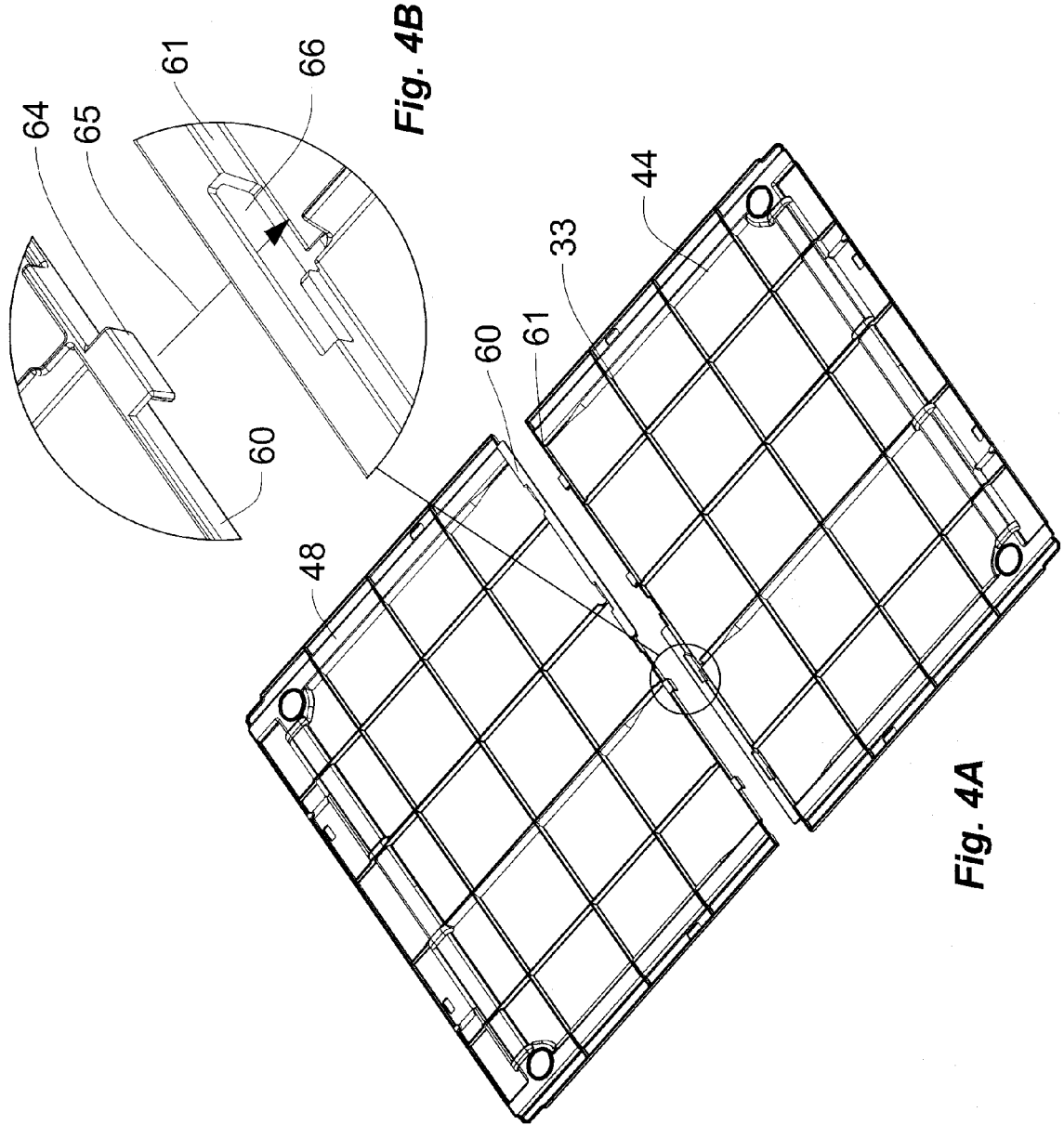

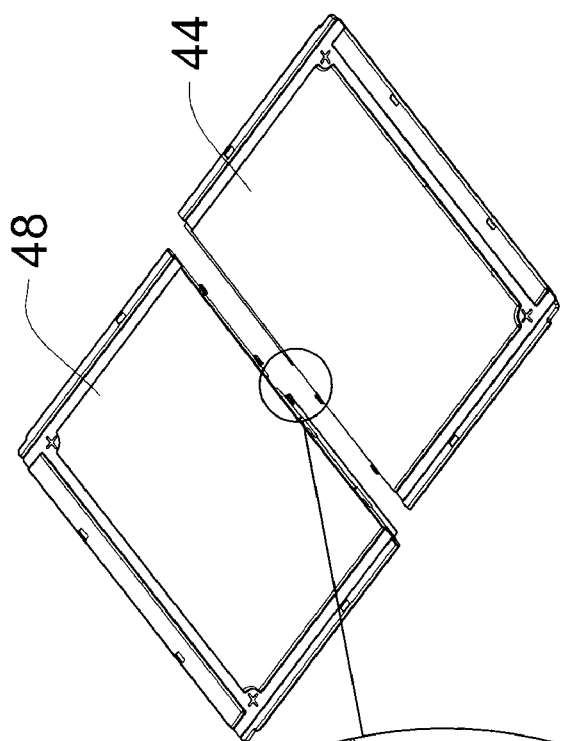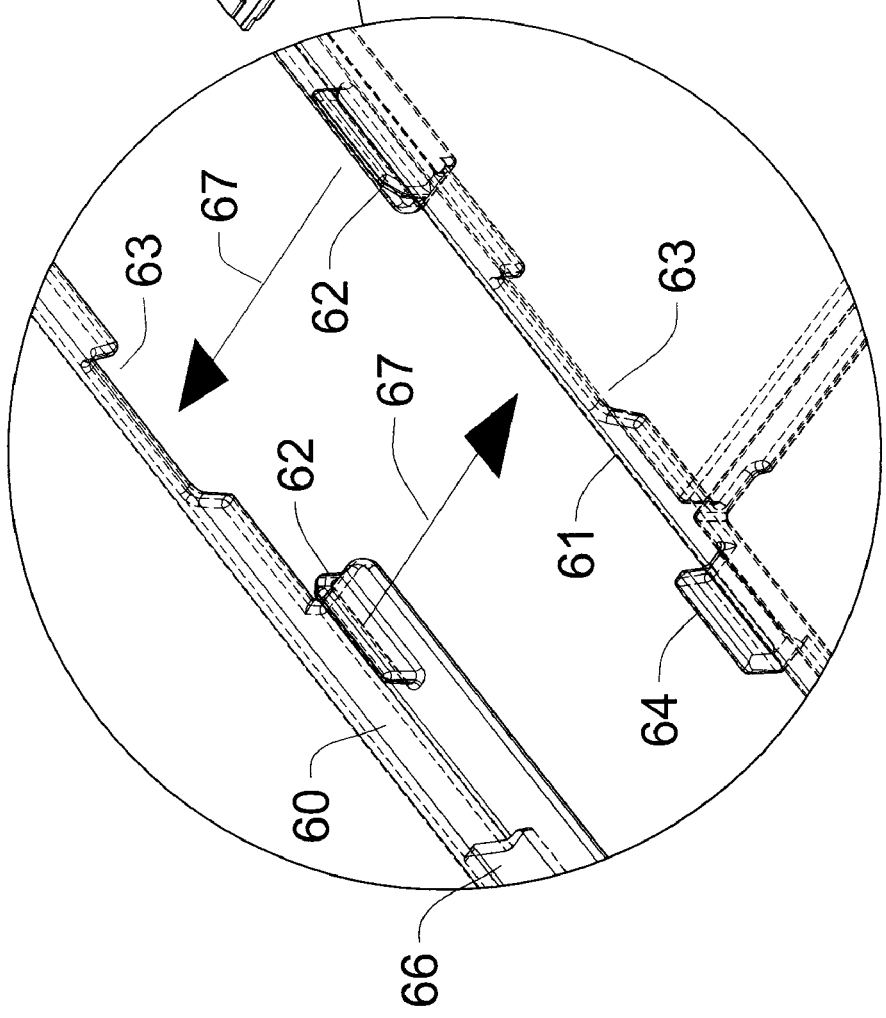
Fig. 5A
Fig. 5B

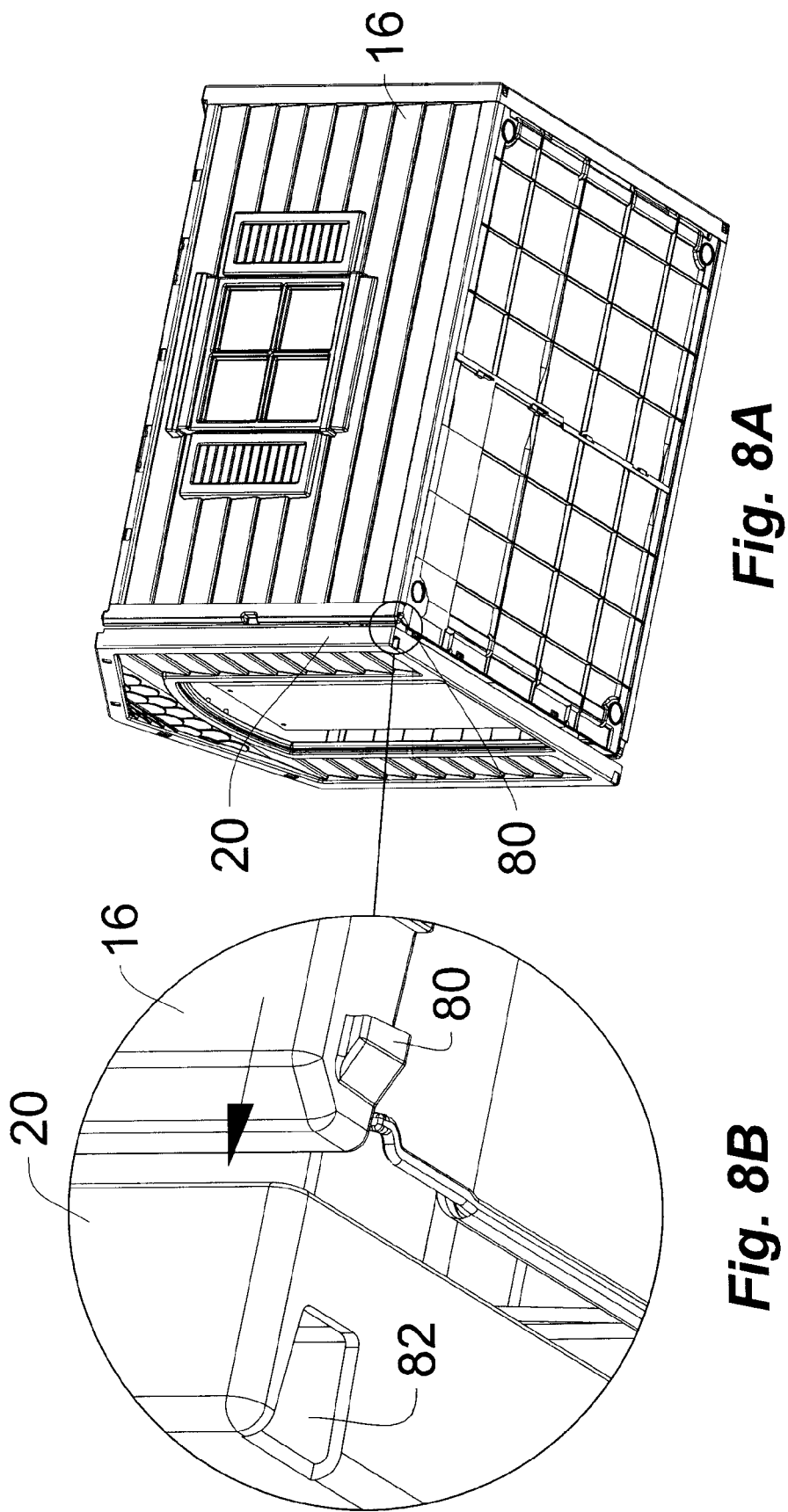

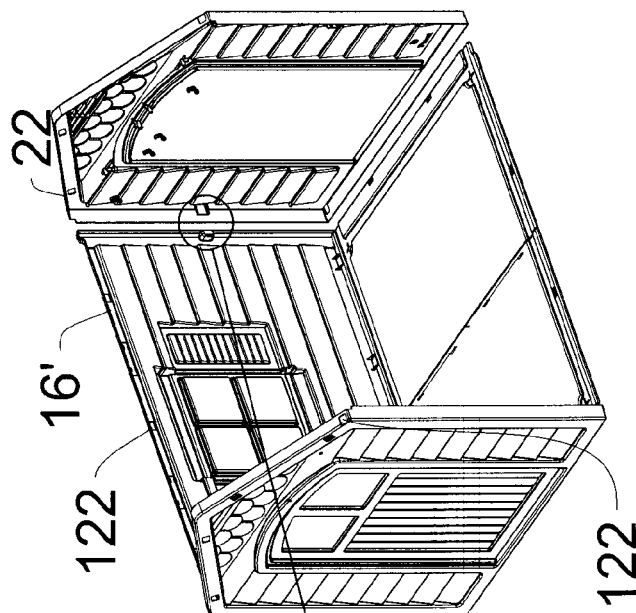
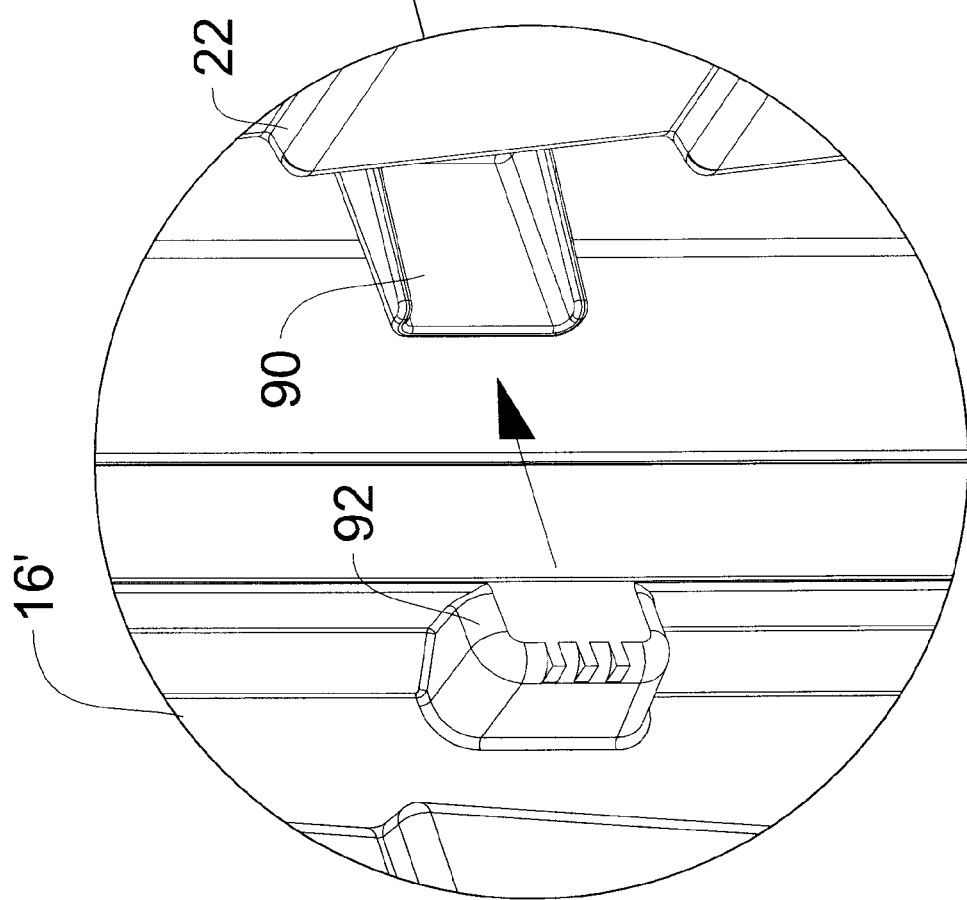

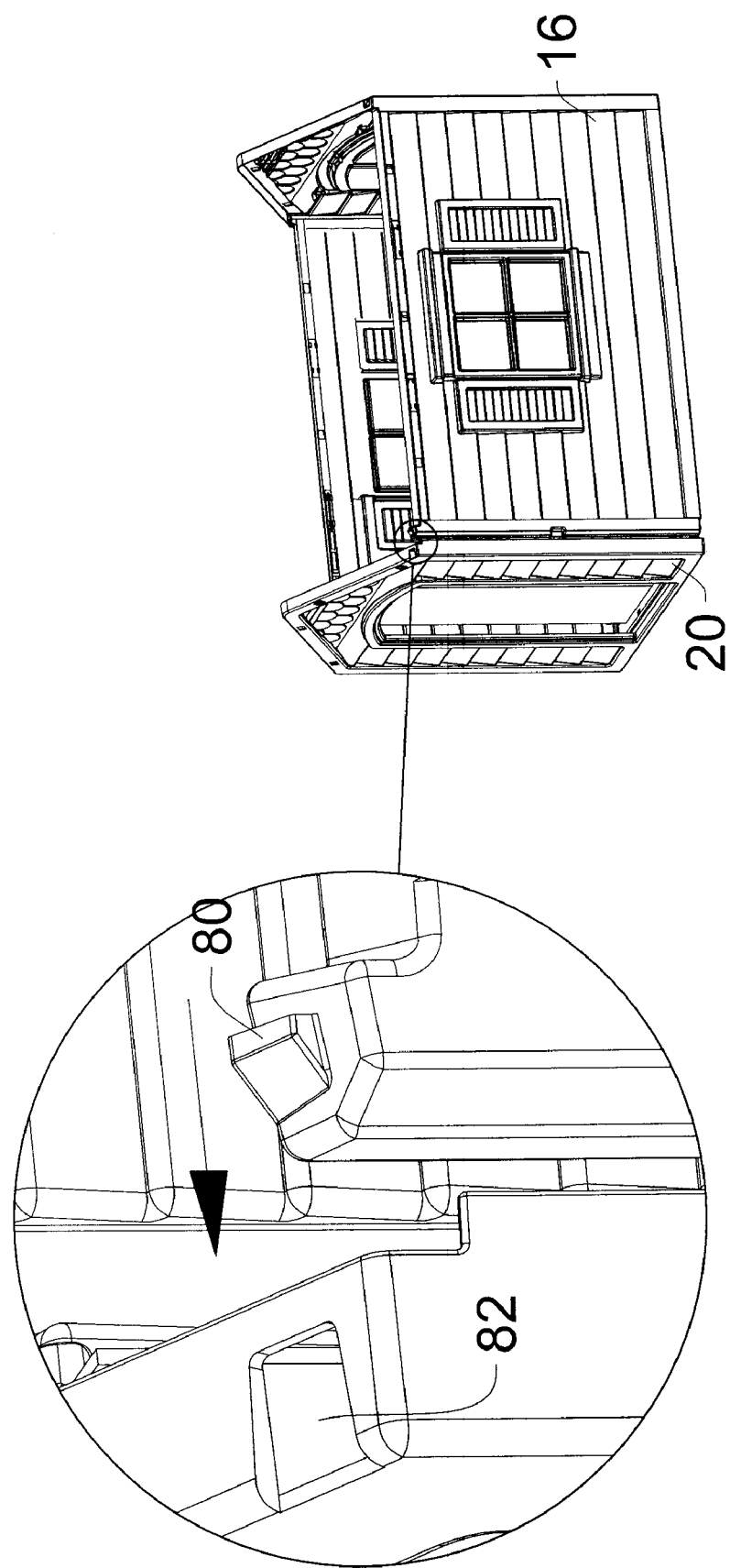

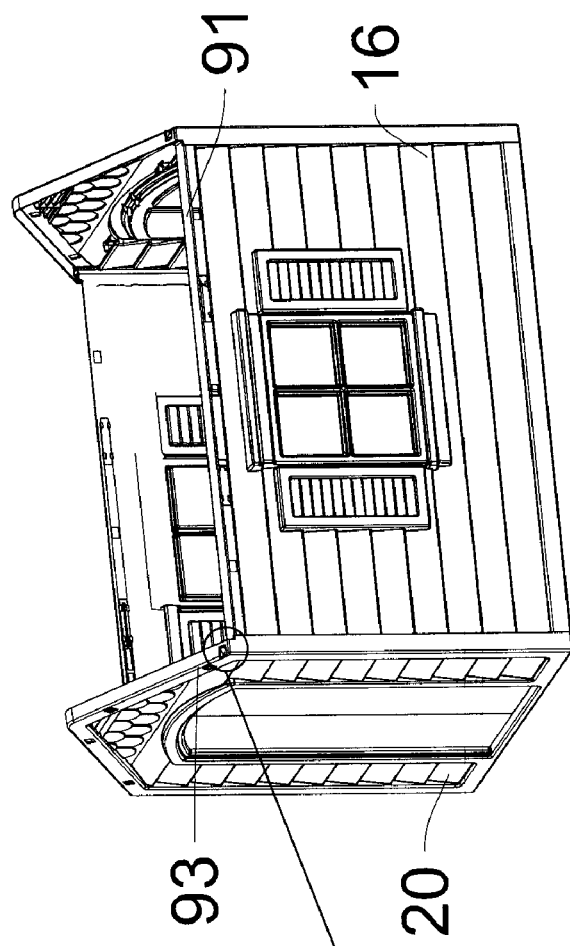
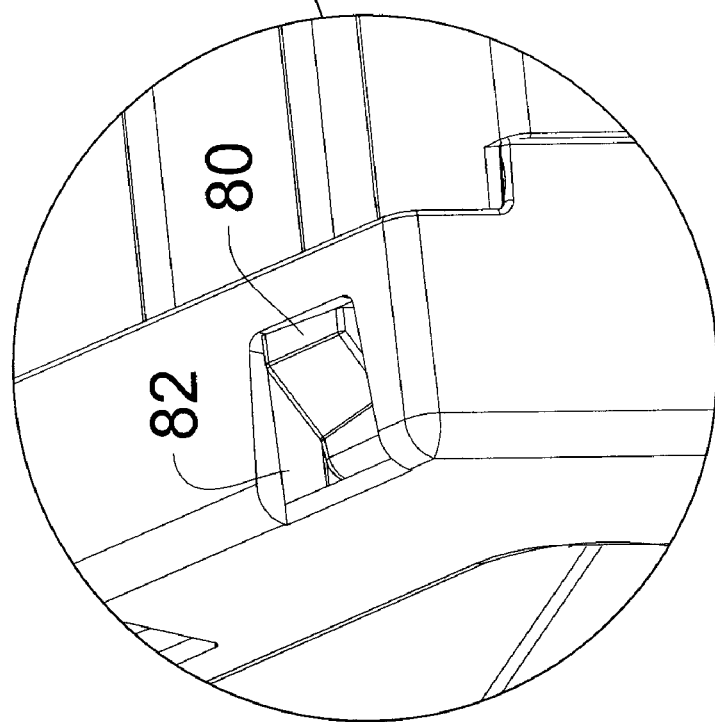
Fig. 11A
Fig. 11B

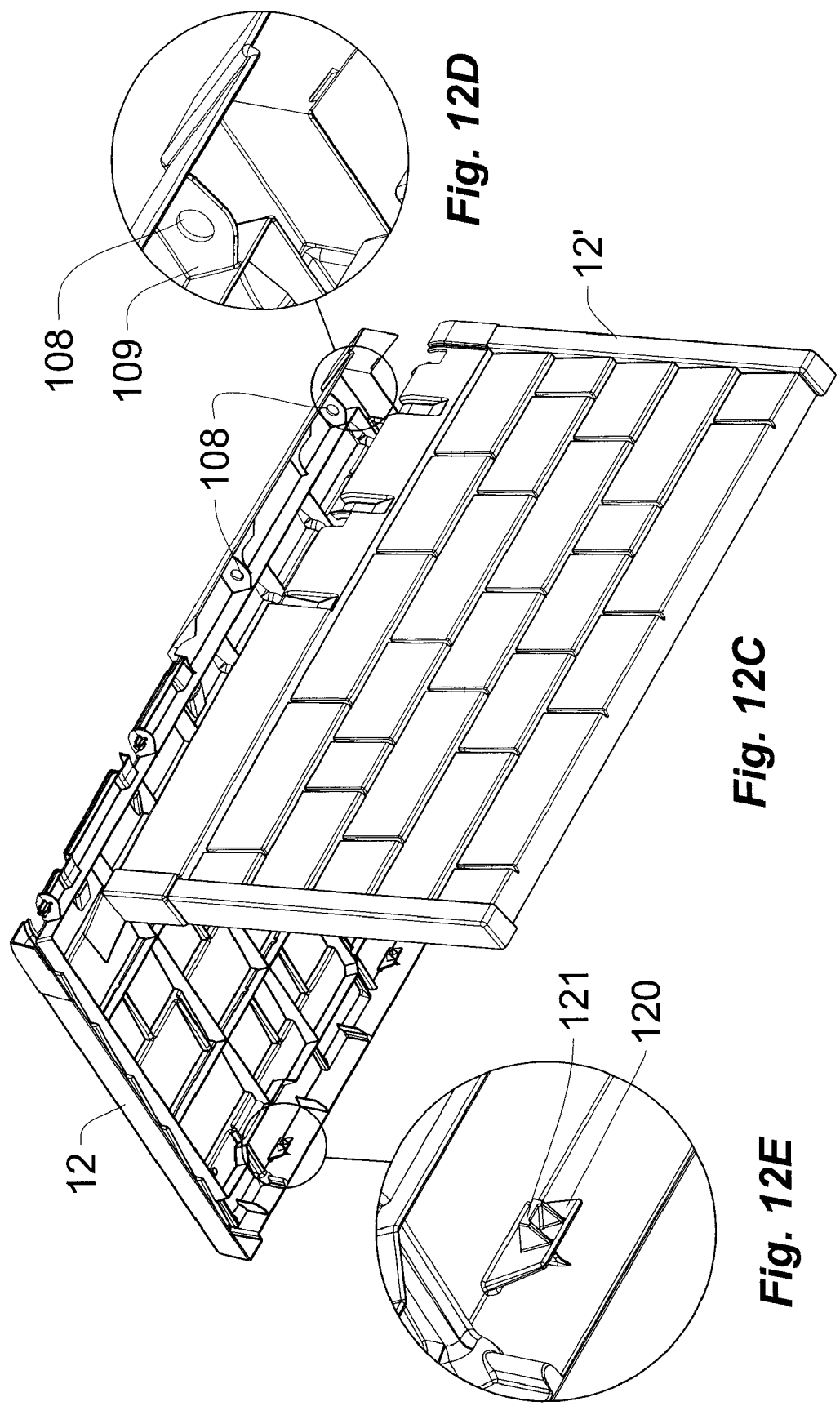

PET SHELTER CONSTRUCTION

FIELD OF THE INVENTION

The field of the invention is directed to pet shelters and in particular to an all plastic pet shelter for use in an outdoor setting for protection of a pet from the elements.

BACKGROUND OF THE INVENTION

The companionship provided by pets is well documented. Dogs in particular, commonly referred too as "mans best friend" have become so integrated into the lives of the lives of their owner that their well being and safety is of paramount concern. However, not all pets can remain near their owner at all time and in many instances enjoy being placed outdoors. For some pets, particularly large dogs, placement outside is necessary for their health. The outdoors provide an area for exercise and provides stimulation that that improves the disposition of the dog. However, dogs cannot take care of themselves and being placed outdoors requires that some sort of protection is provided from the elements. This is especially important where a pet is keep on a lease thereby limiting the ability for the dog to escape the elements. For this reason pet owners typically provide a pet shelter to protect the pet from the weather.

Pet shelters have been constructed from most every type of material with the main purpose of protecting the pet from direct sunlight, rain, wind, cold and if the pet is left outside the shelter may operate as an enclosure to shelter the pet from other animals that may roam the night. The construction of most known pet shelters include items that are problematic in assembly or require tools for assembly. Further, prior art designs may include materials that are subject to rot such as wood, or require the use of metal fasteners that are subject to rusting. In addition, known prior art include assembly kits that were not designed to store compactly for purposes of shipping necessitating larger packaging containers that take more space to store and are more expensive to ship.

What is needed in the art is pre-constructed pet shelter that can be compactly stored/shipped, can be assembled without tools, is made entirely of plastic to prevent premature degradation, and is structurally sound so as to provide the pet with comfort in most any weather condition.

DESCRIPTION OF THE PRIOR ART

U.S. Pat. No. 5,220,883 discloses a prefabricated doghouse structure having a separate sections secured in place by interlocking components.

U.S. Pat. No. 7,243,614 discloses a modular animal enclosure including a housing comprising a top portion affixed to a base portion to form a sheltered interior. The housing includes a door aperture and a climate conditioning aperture with an attachable climate conditioning unit installed over it to facilitate a flow of atmospheric air from the exterior environment into the interior of the housing.

U.S. Pat. No. 6,758,167 discloses a modular pet house having peripheral walls with a plurality of mountings selectively mountable in the housing.

U.S. Pat. No. 5,937,792 discloses a pet shelter construction including a floor unit having a solar heat reservoir raised above the ground.

U.S. Pat. No. 5,727,501 discloses a doghouse having walls supported by a base unit and a roof supported by the walls. The walls include an aperture portion, a far lateral aperture portion, a topmost aperture portion, and a near lateral aperture portion. The entrance opening wall includes a near wall half and a far wall half. The entrance opening is entirely included in the near wall half. The bottommost aperture portion of the entrance opening is spaced above the base unit by a vertical offset distance.

U.S. Pat. No. 5,575,239 discloses a doghouse having a press-fit attachment described with a first member of each pair being integral with the base portion and a second member of each pair being integral with the top portion. Another aspect of the present invention employs a stake through an opening in an interior floor surface to secure the animal shelter to the ground.

U.S. Pat. No. 5,081,956 discloses a doghouse with multi-channel flow-through fresh air ventilation comprising a generally arcuate-shaped hollow top part which has a rectangular circumferential bottom rim configured with four sharp corners, and a generally box-shaped hollow bottom part which has an octagonal circumferential top rim configured with four cut corners.

U.S. Pat. No. 4,802,443 discloses a dome-shaped animal shelter having a separable housing and base made from reinforced plastic.

U.S. Pat. No. 5,791,293 discloses an animal shelter including a top, where the entrance is, formed as a unitary shell and shaped to resemble a natural object having an irregular surface, such as a tree stump to resemble a natural object so the animal shelter blends into a natural setting.

U.S. Pat. No. 7,021,243 discloses a pet shelter including a bottom and a top member both having an edge, and a medial member with a top and bottom edge disposed between the top and bottom members. The pet shelter includes a lock for selectively interconnecting the bottom member to the bottom edge of the medial member and a lock for selectively interconnecting the top member to the top edge of the medial member. The lock includes a tab disposed in the bottom edge of the medial member and a tab disposed in the edge of the top member. The bottom member includes an aperture for receiving the medial member tab to thereby selectively lock the bottom member to the medial member.

SUMMARY OF THE INVENTION

A pet shelter constructed for plastic panels having interlocking connectors for ease of assembly and elimination of early degradation components typically found in pet shelters containing metal or wood components. The pet shelter of the instant construction having a two piece floor with interlocking connectors for use in support of one piece side wall panels and a front and rear wall panel. Each of said wall panels having bottom edge constructed and arranged to cooperate with the floor panel for securement by use of interlocking tabs, each said wall further coupling to an adjoining wall further by use of interlocking tabs. The front wall panel includes a door for providing ingress and egress. A roof is provided for enclosing the top of the pet shelter, the roof includes a first and second interconnecting panel. The roof panels secure to the top of the each wall panel by use of interlocking tabs.

Accordingly, it is an objective of the instant invention to disclose a pet shelter that can be assembled without tools.

It is a further objective of the instant invention to disclose a pet shelter having modular components to allow storage and shipping with minimal packaging.

It is yet another objective of the instant invention to disclose a pet shelter constructed of plastic thereby eliminating early degradation typical of wood and/or metal construction.

It is a still further objective of the invention to disclose the use of overlapping roof panels that overlie the roof crown to inhibit weather entry.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 4A is a perspective view of the bottom of the floor panels;

FIG. 4B is a partially enlarged perspective view of the floor panel connector;

FIG. 5A is a perspective view of the top of the floor panels;

FIG. 5B is a partially enlarged perspective view of the floor panel connector;

FIG. 8A is a perspective bottom view of the front wall panel about to be coupled to the floor panel and side wall panel;

FIG. 8B is an enlarged view of a bottom connector depicted in FIG. 8A;

FIG. 9A is a perspective view of a rear wall panel being connected to a side wall panel;

FIG. 9B is an enlarged view of a side wall connector depicted in FIG. 9A;

FIG. 10A is a perspective view of the side panel being coupled to the front panel;

FIG. 10B is an enlarged view of the side wall connector depicted in FIG. 10A;

FIG. 11A is a perspective view of a front panel coupled to a side panel;

FIG. 11B is an enlarged view of the side wall connector depicted in FIG. 11a;

FIG. 12C depicts the roof panels at an angle to allow a view of the receptacle or the roof locking mechanism;

FIG. 12D is an enlarged view of the roof receptacle;

FIG. 12E is the locking element for securement of the roof panel to a side wall panel;

FIG. 13B is an enlarged view of the connectors for the flex door depicted in FIG. 12a;

DETAILED DESCRIPTION OF THE INVENTION

Figure 1:
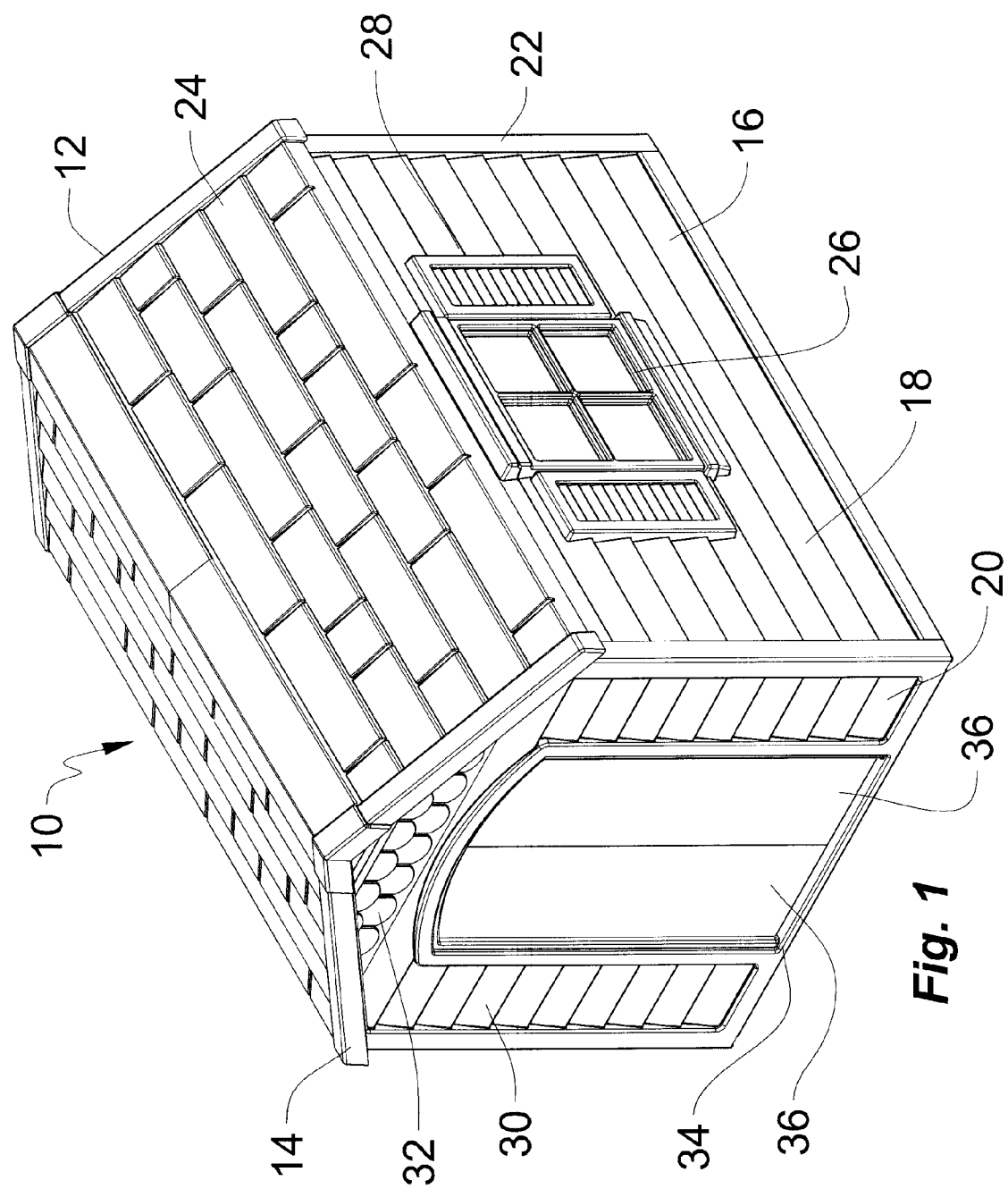
FIG. 1 is a front perspective view of the pet shelter of the instant invention.
Figure 2:
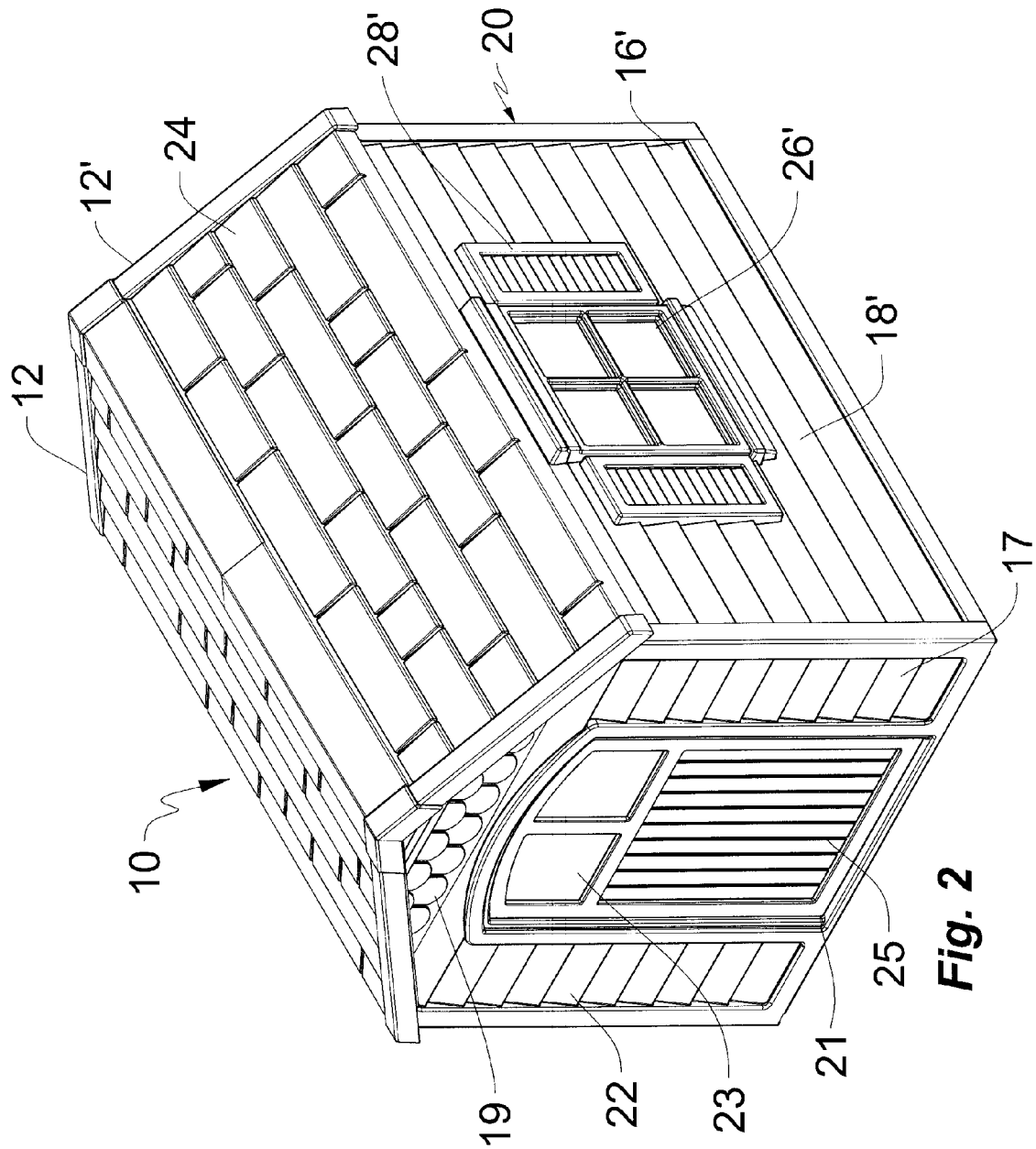
FIG. 2 is a rear perspective view of the pet shelter.

Referring now to FIGS. 1 and 2, depicted is a prefabricated plastic pet shelter (10) of the instant invention. The pet shelter is defined by a first roof panel (12) and a second roof panel (12'). The roof panels are interchangeable and overlap as will be further explained. The roof panels may include ornamental shapes such as tiles or simulated shingles (24) to provide the appearance of a conventional roof. Each said roof panel is supported by a side wall panel (16 & 16'), a front wall panel (20) and a rear wall panel (22).

The side wall panels (16 & 16') are interchangeable and may include ornamental shapes such as siding (18 & 18'), a window (26 & 26'), and shutters (28 & 28'). The front wall panel (20) includes simulated siding (30), and ornamental crown (32). The front wall panel further includes an opening (34) with flexible swinging doors (36 and 36'). The rear wall panel (22) may also include siding (17), a fanciful crown (19) and a false doorway (21). In this embodiment, the false doorway may include windows (23) and have an outer texture (25) that provides the appearance of a wood slat doorway.

Figure 3:
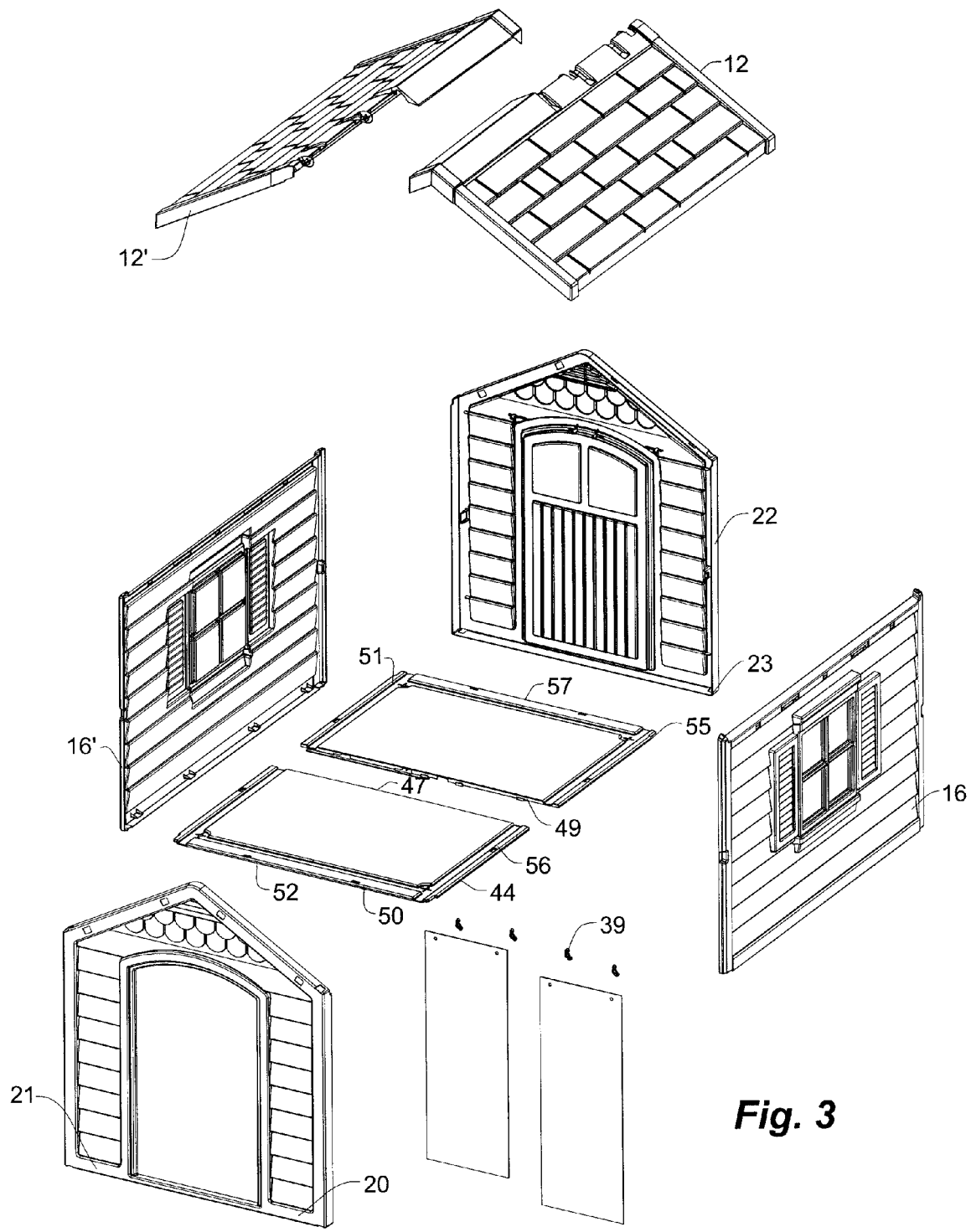
FIG. 3 is an exploded view of FIG. 1.

The exploded view depicted in FIG. 3 illustrates the pet shelter in its component parts. Depicted is the pet shelter right side wall (16), left side wall (16'), front wall (20) and rear wall (22). Further shown is a roof comprising panels (12 and 12'). The foundation for the doghouse is a floor which consists of a first floor panel (44) having a first edge (47) operatively associated with a second floor panel (48) having a first edge (49). The floor panel (44) is further defined by a second edge (52), third edge (54) and fourth edge (56). The second edge (52) of floor panel (44) allows for securement to the bottom edge (21) of front panel (20) by use of interlocks described later in this application. Third edge (54) and forth edge (56) also permit coupling to their respective side wall panel (16 and 16')) using interlocks. Similarly, second panel (48) includes a first edge (49) for securement to the adjoining edge (47) of the first panel (44). The second floor panel (48) includes a second edge (57) operatively associated for coupling to the bottom edge (23) of rear panel (22). A third edge (51) is secure to the panel (16') and a forth edge (55) secures to the wall panel (16). Front door panels (36 & 36') are securable to the front panel (20) by fasteners (39).

Referring now to FIGS. 4A and 4B there shown is a bottom view of floor panels (44 and 48). The means for connecting the panels (44 and 48) includes a longitudinally extending wall (60 and 61) with a tab member (64) operatively associated with the aperture (66) located in the longitudinally edge wall (61) which allows for insertion of the tab member through the aperture as depicted by the directional arrow (65) with a locking condition provided by movement of panels (44 and 48), shown in FIG. 6, by sliding of the panels in accordance with the directional arrows (69 and 71). The assembly creates a seamed floor that minimizes the entry of the elements. Raised ridges (33) space the floor above the ground providing an air gap; the air gap providing an insulating barrier between the pet and the ground.

Referring now to FIGS. 5A and 5B a top view of the floor is shown in FIG. 5A. Another means for connecting the floor panels (44 and 48) includes an upstanding projection member (62) and an associated aperture (63). The upstanding projection member (62) of one floor panel passes through the aperture (63) of the other floor panel, as depicted by directional arrows (67). A locking condition of the floor panels is then provided by movement of the panels (44 and 48), shown in FIG. 6, by sliding of the panels in accordance with the directional arrows (69 and 71). This assembly creates a seamed floor that minimizes the entry of the elements.

Figure 6:
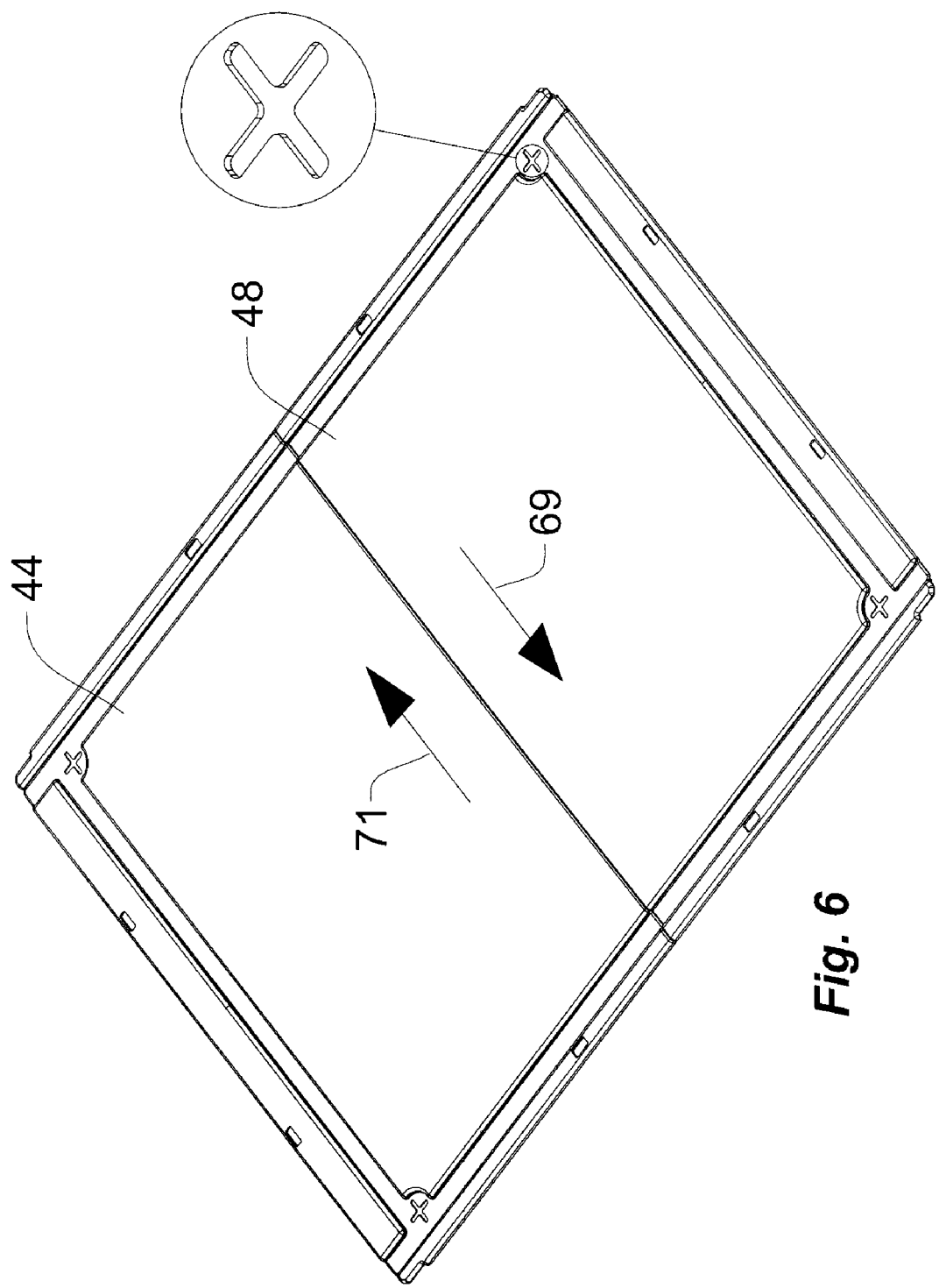
FIG. 6 is a top view of an assembled floor panels with arrows illustrating interlocking.
Figure 7:
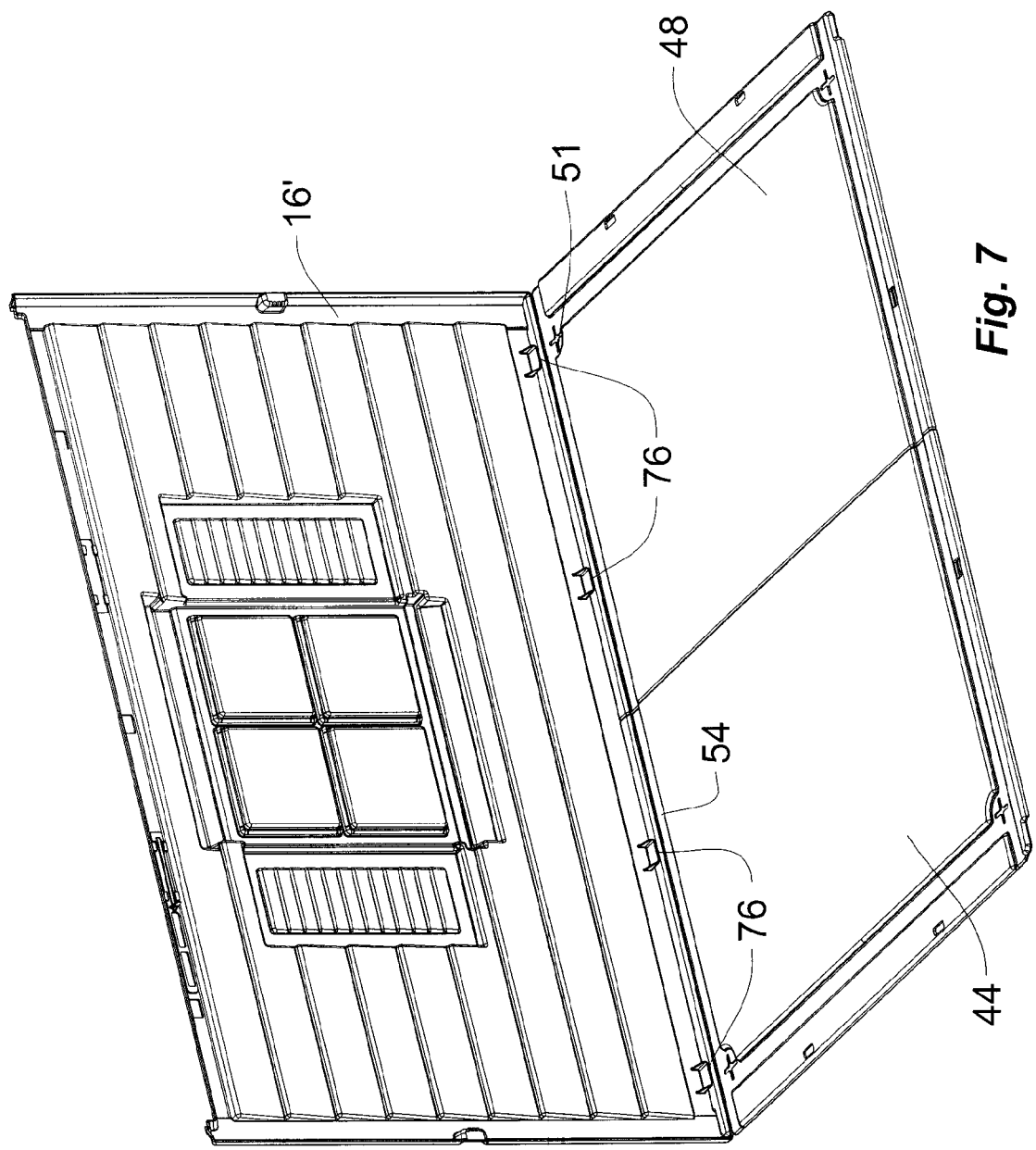
FIG. 7 is a perspective view of a side wall panel connected to the floor panels.

Referring now to FIG. 6, depicted are the floor panels (44 and 48) coupled to the left panel side wall (16') wherein alignment tabs (76) are formed integral thereto and are positionable above the edge of the floor panels (44 and 48). Similarly, a right side panel, not shown, includes alignment tabs for positioning over the edge (54 and 51) of each floor panel. The side wall panel (16') locks the floor panels in position by preventing the transverse movement needed for assembly of the floor panels.

Figure 8C:
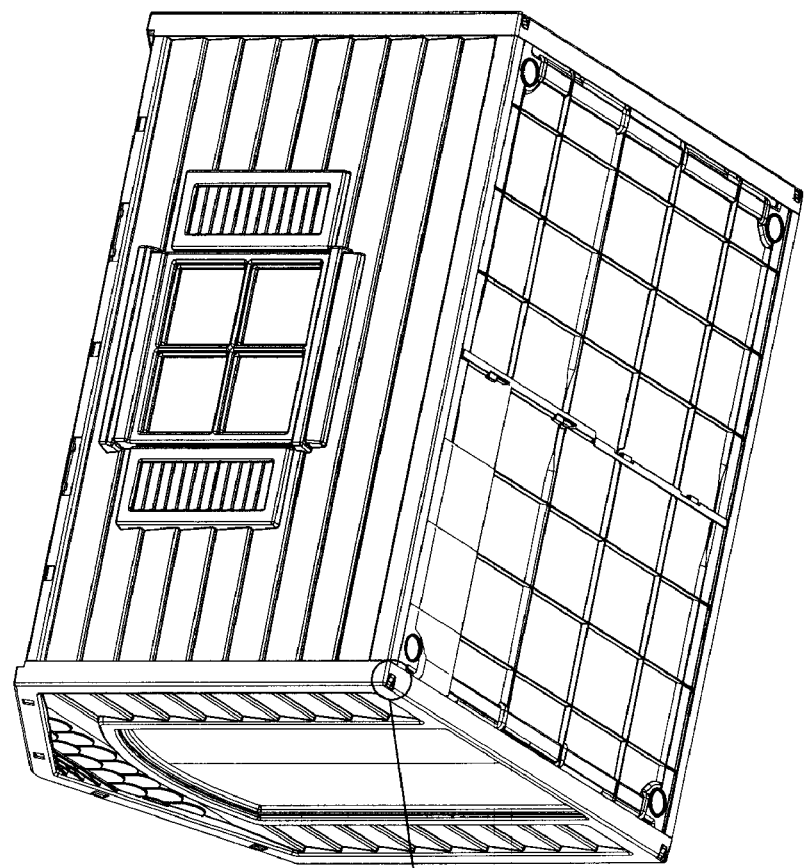
FIG. 8C is a perspective bottom view of the front panel coupled to the floor panel and side wall panel.
Figure 8D:
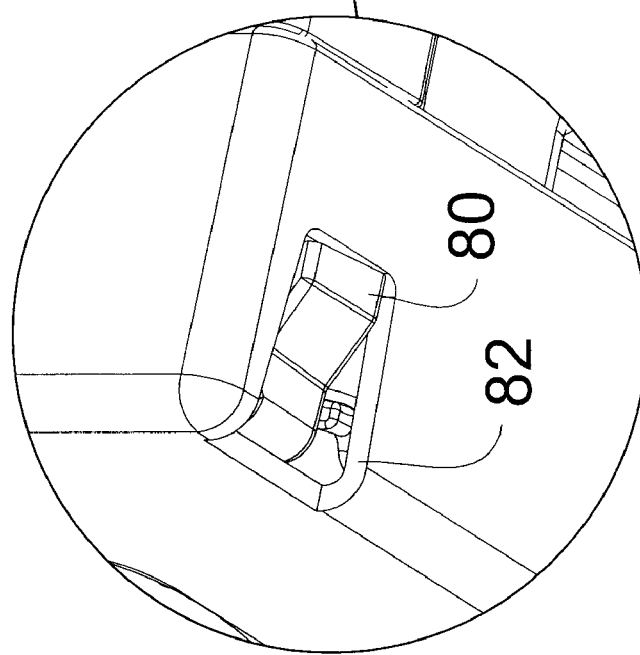
FIG. 8D is an enlarged view of the front panel in a coupled position to the floor panel.

FIGS. 8A-8D depict a series of alignment bosses (80) positioned along the bottom and top edge of the wall panels operatively associated with an aperture (82) on an adjoining front or rear panel and being constructed and arranged so that the alignment boss enters into and engages the aperture and secures the wall panels to the end panels together. The bosses and apertures are located on each side wall for engagement with the front wall and rear wall. The alignment boss maintains the panels in a fixed position without use of an independent fastener. FIGS. 8A and 8B depict an unassembled connection while FIGS. 8C and 8D depict the alignment boss (80) placed through the aperture (82) and locked in position with the front and rear panel. Referring now to FIGS. 9A and 9B shown is the front panel (22) provided with a spaced apart finger (90) and alignment boss (92) shown in an adjacent side wall panel (16')). These fingers and bosses are constructed and arranged so that the fingers overlap and engage the bosses to secure the vertical portion of each front panel and rear panel to the side panels. FIGS. 10A and 10B depict the placement of the alignment boss (80) and recess (82) allowing a position at the top of the side panel (16) and front panel (20). FIGS. 10a and 10b depict the alignment boss (80) placed into the aperture (82) thereby locking the upper edge in this figure (91) of side panel (16) to the upper edge (93) of front panel (20).

Figures 12A, 12B:
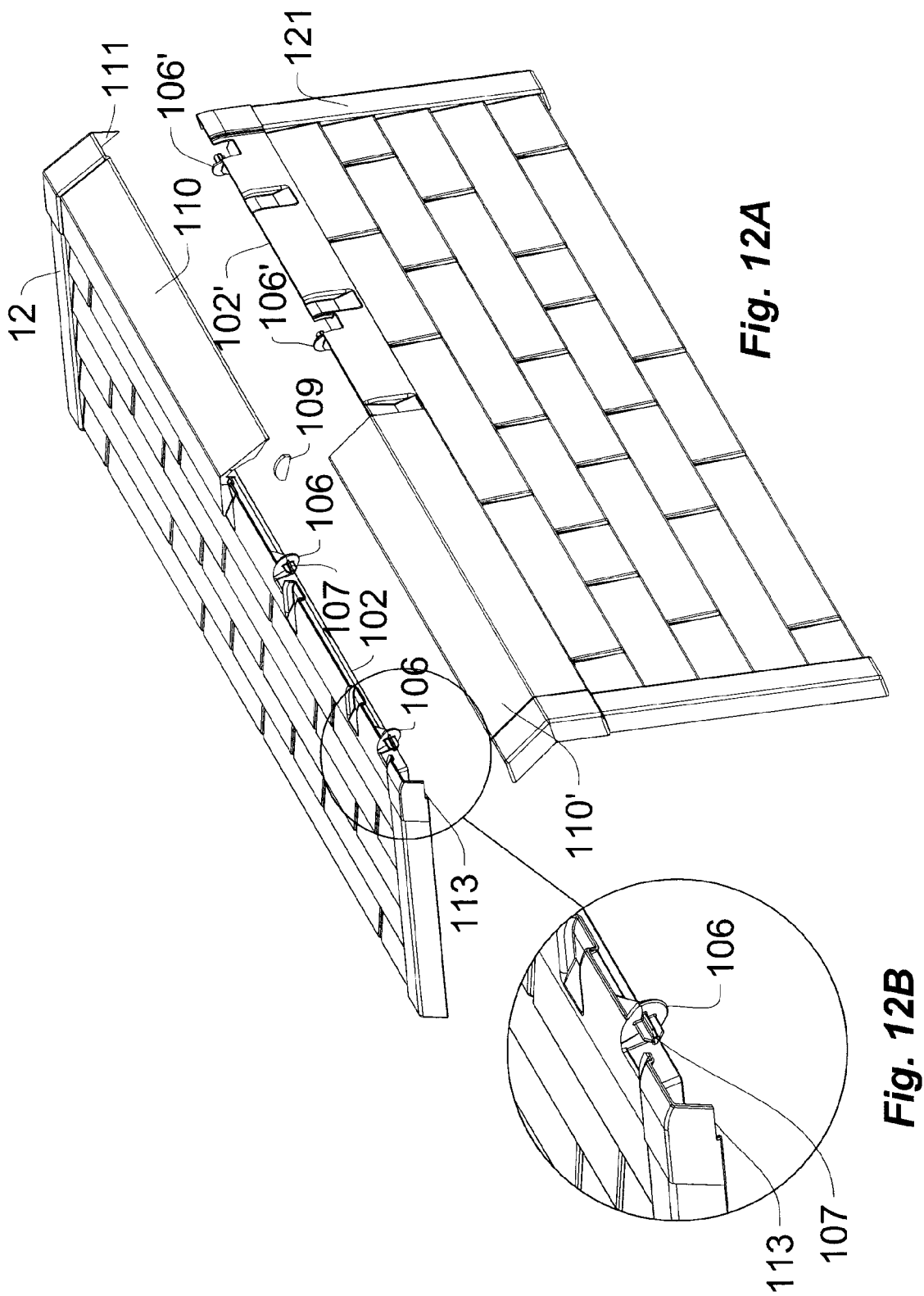
FIG. 12A is an exploded view of the first and second roof panel.
FIG. 12B is an enlarged view of a connector of the roof panel depicted in FIG. 12A.

In a manner similar to the floor panels, the roof panels (12 & 12') include a slideable interlock wherein each roof panel has a first edge (102) which is secureable to the first edge of an adjacent panel (102') having a series of spaced apart connecting members (106 and 106'). Connecting members (106 and 106') on one of the roof panels are provided with projections (107) which are insertable into apertures or recesses (108) on corresponding connecting members (106). For similar purposes, each of the roof panels (12 and 12') are assembled together at an acute angle wherein the spaced apart projections (107) of connecting members (106) are inserted into the recesses (108) of corresponding connecting members (106) The panels are slid together to engage the projections and recesses and then each panel (12 and 12') rotated so that the overlapping panel flaps (110 and 110') provide a seal over the adjacent panel and attachment fingers and recesses. A seal (109) is placed at the junction of the two overlapping roof flaps and shown in FIG. 12A.

At an end of each of the roof flaps (110 and 110') there is an alignment boss (111) and a corresponding alignment socket (113). The alignment boss (111) engages the alignment socket (113) locking the roof panels together after the roof panels have been rotated into their final position.

FIG. 12E depicts use of an alignment boss (120) for use in engaging an alignment socket (122) as shown in FIG. 9A which upon placement forces the raised portion (121) of the alignment boss (120) into each alignment socket (122). In this manner, the floor panels, side walls, front and rear wall, and roof panels can be assembled without fasteners with the use of alignment tabs and fingers with associated sockets and receptacles.

A vent can be optionally provided the side wall panels (16 and 16') as shown in FIG. 10A. A sliding member (115) is positionable over aperture (117) located in the top portion of the side wall panel. This vent allows warm air to be vented from the pet shelter.

Figure 13B:
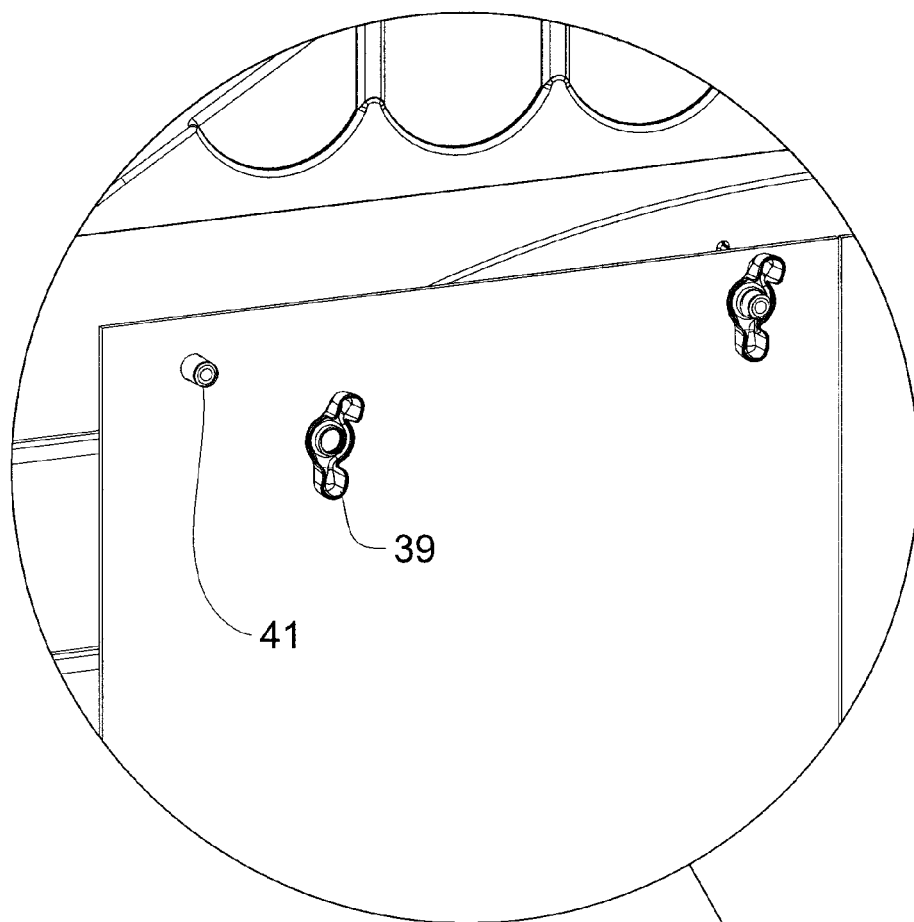
Figure 13A:
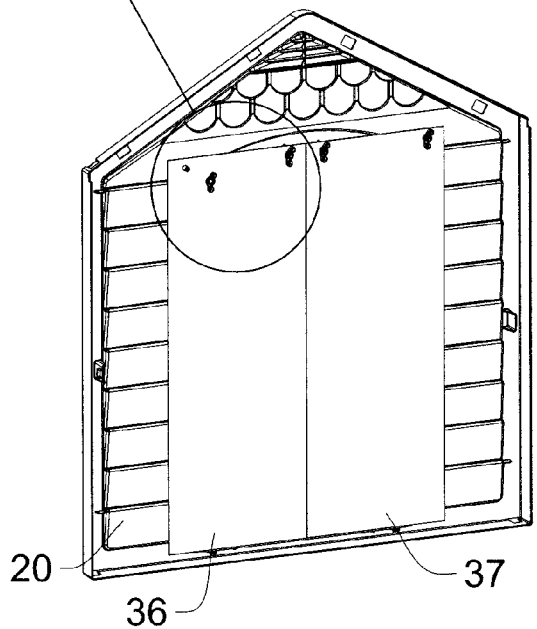
FIG. 13A is a perspective view of a front panel with flex doors.

Referring to FIGS. 13A and 13B, the front wall forms an opening into the assembly pet shelter by allowing the dog to enter the housing by pushing of the flexible doors (36 or 36') which are attached to the front panel (20) by bosses (41) that receive the fastener (39) thereby engaging each of the flexible front doors therebetween. It should be noted that the many of these reference components can be interchanged, for instance, each side wall can be made to form a mirror image of the opposite side wall. The first roof panel can be made a mirror image of the second roof panel. The first floor panel can be made a mirror image of the second floor panel. The flexible doors may also be interchanged. The interchangeability allows reduces the need for extra manufacturing equipment. However, for purposes of assembly each panel may be marked individual to assist the individual during the assembly process.

Figure 14:
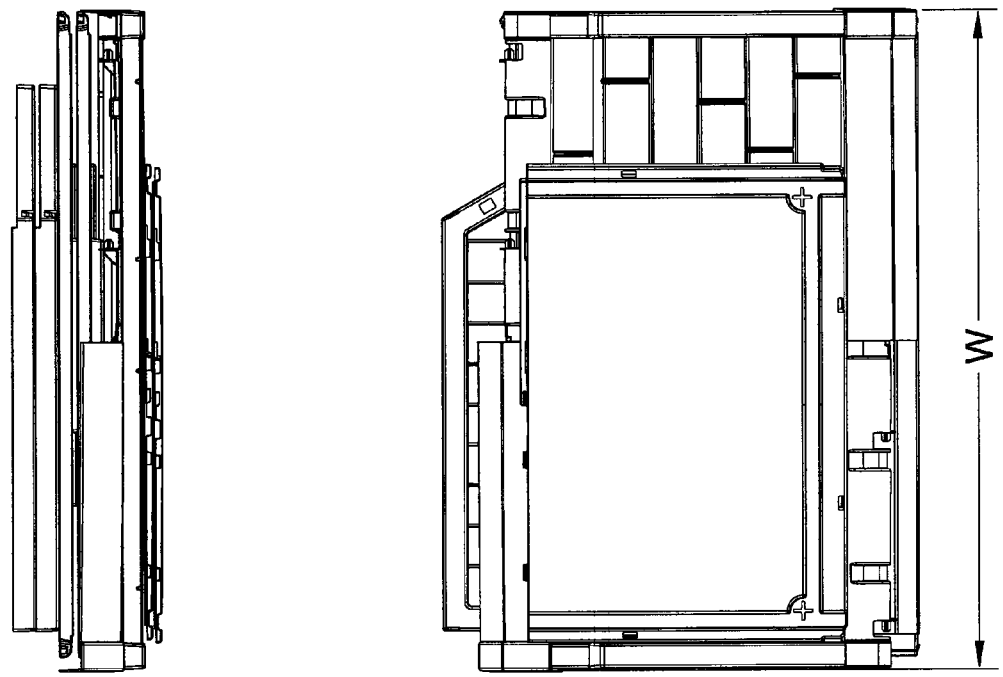
FIG. 14 is a top plain view of all panels of the pet shelter in a storage/shipping position.
Figure 15:
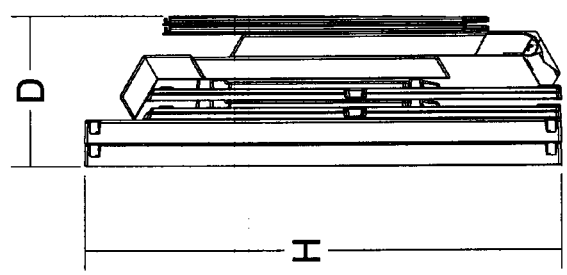
FIG. 15 is an end view of panels in a storage/shipping condition.

Referring now to FIGS. 14 and 15, the compactness of the doghouse is shown for purposes of shipment and storage with the width (w) of the package together with the height (h) and depth (d) providing for low cost storage and shipping.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A pet shelter comprising:
a floor for enclosing the bottom of said pet shelter said floor including a plurality of floor panels, each said floor panel includes a first edge constructed and arranged for interlocking connection with a first edge of another said floor panel to form said floor, said floor panels further including a second edge opposite said first edge, a third edge substantially perpendicular to and extending between said first and said second edges, a fourth edge substantially perpendicular to and extending between said first and said second edges;

a plurality of side wall panels for enclosing a left side and a right side of said pet shelter said plurality of side wall panels for enclosing a left side and a right side of said pet shelter each include a bottom edge, said bottom edge extending under a lower surface of said floor;

a rear wall panel for enclosing a back of said dog house;

a front wall panel for enclosing a front of said pet shelter, said front wall panel including a door for providing ingress into and egress from said pet shelter;

each of said side, said front and said rear panels including at least one attachment means for securing said panels together in a substantially perpendicular arrangement with respect to each other, said attachment means comprising at least one alignment boss positioned proximate a vertical edge of one panel and at least one aperture positioned proximate a vertical edge of an adjacent perpendicularly arranged panel, said alignment bosses and said apertures being constructed and arranged so that said alignment boss enters into and engages said aperture enclosing said floor and maintaining said perpendicular arrangement without additional fasteners;

a roof for enclosing a top of said pet shelter, said roof including a plurality of roof panels, each said roof panel includes a first edge constructed and arranged for interlocking connection with a first edge of another said roof panel to form said roof, said roof further including a second means for connection to a top edge of at least one of said side panels, said front panel and said rear panel;

wherein said first edge of each of said floor panels include a longitudinally extending edge wall, said edge wall including a vertical portion substantially perpendicular to said floor panel and a horizontal portion substantially perpendicular to said vertical portion, at least one tab member and at least one aperture positioned in said longitudinally extending edge wall, said tab members and said edge walls on corresponding floor panels being constructed and arranged for cooperative engagement of each other;

wherein said aperture and said tab member on each said first edge of said floor panel are spaced in a longitudinal direction of said longitudinally extending edge wall with respect to each other to enable a tab member of said one floor panel to be inserted through an aperture of said another floor panel and then one of said floor panels moved longitudinally of said edge wall whereby said tab member of said floor panel engages said edge wall of said another floor panel and interlockingly connect said floor panels together;

wherein said first edge of each of said floor panels include a first upstanding projection member spaced from and substantially parallel to said longitudinally extending edge wall, an aperture in said longitudinally extending edge wall longitudinally spaced from said upstanding projection, said upstanding projection and said aperture being constructed and arranged to enable said upstanding projection of one said floor panel to pass through said aperture of another said floor panel, said floor panels are then moved transversely with respect to each other whereby said upstanding projection and said longitudinally extending edge wall of one of said floor panels engages and secures said longitudinally extending edge wall of said other floor panel thereby securing said floor panels together;

wherein said roof panels further include an alignment boss on at least one end of said top edge of said roof panel, said alignment boss engages an alignment socket positioned on a corresponding end of said top edge of said another roof panel thereby connecting said roof panels together.

2. The pet shelter of claim 1 wherein said roof panels include a plurality of connecting members positioned along a top edge of one of said roof panels, a plurality of corresponding connecting members positioned along a top edge of another said roof panel, said connecting members engaging said corresponding connecting members thereby connecting said roof panels together.

3. The pet shelter of claim 1 wherein said first means for connecting said side wall panels to said floor panels includes a series of spaced apart fingers and recesses, said fingers and recesses being constructed and arranged so that said fingers overlap and mateably engage said recesses of said juxtaposed floor panel to secure said side wall panels to said floor panels.

4. The pet shelter of claim 1 wherein said first means for connecting said rear wall panel to said floor panels includes a series of spaced apart fingers and recesses, said fingers and recesses being constructed and arranged so that said fingers overlap and mateably engage said recesses of said juxtaposed floor panel to secure said rear wall panels to said floor panels.

5. The pet shelter of claim 1 wherein said first means for connecting said front wall panel to said floor panels includes a series of spaced apart fingers and recesses, said fingers and recesses being constructed and arranged so that said fingers overlap and mateably engage said recesses of said juxtaposed floor panels to secure said front wall panel to said floor panels.

6. The pet shelter of claim 1 wherein a flexible member covers said door in said front wall panel and permits ingress into and egress from said pet shelter by an animal.

7. The pet shelter of claim 1 including a third means for connecting said wall panels to each other, said third means includes an alignment boss positioned along a vertical edge on one of said panels and a finger positioned along a vertical edge on another of said panels, said finger being spaced from said vertical edge of said panel, said fingers and alignment bosses being constructed and arranged so that said alignment bosses engage said fingers and secure said panels together in a substantially perpendicular relationship.

8. The pet shelter of claim 7 including a fourth means for connecting said wall panels to each other, said fourth means includes an alignment boss positioned proximate a top of a vertical edge on one of said panels and an aperture positioned proximate a top of a vertical edge on another of said panels, said alignment bosses and said apertures being constructed and arranged so that said alignment boss enters into and engages said aperture and secures said panels together.

9. The pet shelter of claim 1 wherein said second means for connecting said roof to said top edges of said side panels, said rear panel and said front panel include a series of spaced apart fingers and recesses, said fingers and recesses being constructed and arranged so that said fingers overlap and mateably engage said recesses of said juxtaposed roof to secure said side wall panels, said rear wall panel and said front wall panel to said roof.

10. The pet shelter of claim 1 wherein said plurality of side wall panels for enclosing a left side and a right side of said pet shelter each include at least one alignment tab formed integral to an inner surface of each said side panel and extending over a top surface of said floor panel for retaining said floor panel in position and securing each said side wall panel to said floor panels in a substantially perpendicular arrangement.

* * * * *